(12) United States Patent  
Nakano et al.

(10) Patent No.: US 11,063,317 B2  
(45) Date of Patent: Jul. 13, 2021

(54) BATTERY PACK

(71) Applicant: Sanyo Electric Co., Ltd., Daito (JP)

(72) Inventors: Masaya Nakano, Hyogo (JP); Haruhiko Yoneda, Hyogo (JP); Osamu Inaoka, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 212 days.

(21) Appl. No.: 16/067,696

(22) PCT Filed: Dec. 19, 2016

(86) PCT No.: PCT/JP2016/005173  
§ 371 (c)(1),  
(2) Date: Jul. 2, 2018

(87) PCT Pub. No.: WO2017/130259  
PCT Pub. Date: Aug. 3, 2017

(65) Prior Publication Data  
US 2019/0020001 A1    Jan. 17, 2019

(30) Foreign Application Priority Data  
Jan. 26, 2016    (JP) .............................. JP2016-012796

(51) Int. Cl.  
    *H01M 50/213*    (2021.01)  
    *H01M 50/20*    (2021.01)  
    (Continued)

(52) U.S. Cl.  
    CPC ..... *H01M 50/213* (2021.01); *H01M 10/0422* (2013.01); *H01M 10/0525* (2013.01);  
    (Continued)

(58) Field of Classification Search  
None  
See application file for complete search history.

(56) References Cited

U.S. PATENT DOCUMENTS

2008/0220321 A1    9/2008    Yonemochi et al.  
2010/0047676 A1*    2/2010    Park ...................... H01M 2/105  
                                                                                            429/93  
(Continued)

FOREIGN PATENT DOCUMENTS

EP          2891196 A1    7/2015  
JP        2007-227171 A    9/2007  
(Continued)

OTHER PUBLICATIONS

Extended (Supplementary) European Search Report dated Dec. 4, 2018, issued in counterpart European Patent application 16887848.6. (8 pages).

(Continued)

*Primary Examiner* — Alix E Eggerding  
(74) *Attorney, Agent, or Firm* — Westerman, Hattori, Daniels & Adrian, LLP

(57) ABSTRACT

The battery pack includes: a plurality of battery cells each formed by closing an opening of a bottomed cylindrical outer can with a sealing plate; a battery holder to hold the plurality of battery cells in a mutually parallel attitude and hold electrode terminals provided at both ends of each battery cell in an attitude disposing on a same plane; and an outer case to house a battery assembly formed by holding the plurality of battery cells in the battery holder. The battery holder includes: a holding part to hold the ends of the plurality of battery cells along outer peripheral surfaces of the outer cans; and a cover on an end surface side of the plurality of battery cells held by the holding part. When the battery cell is abnormal, the cover is deteriorated by energy of a jetting body jetted from an end surface of the battery cell.

20 Claims, 9 Drawing Sheets

(51) Int. Cl.
*H01M 50/30* (2021.01)
*H01M 50/147* (2021.01)
*H01M 50/383* (2021.01)
*H01M 10/623* (2014.01)
*H01M 10/6553* (2014.01)
*H01M 10/04* (2006.01)
*H01M 10/0525* (2010.01)
*H01M 10/42* (2006.01)

(52) U.S. Cl.
CPC ..... *H01M 10/623* (2015.04); *H01M 10/6553* (2015.04); *H01M 50/147* (2021.01); *H01M 50/20* (2021.01); *H01M 50/30* (2021.01); *H01M 50/383* (2021.01); *H01M 50/394* (2021.01); *H01M 10/4235* (2013.01); *H01M 2220/30* (2013.01)

(56) References Cited

U.S. PATENT DOCUMENTS

| | | | |
|---|---|---|---|
| 2010/0266880 A1 | 10/2010 | Hirakawa et al. | |
| 2010/0273034 A1* | 10/2010 | Hermann | H01M 2/1094 429/62 |
| 2012/0164490 A1* | 6/2012 | Itoi | H01M 2/204 429/7 |
| 2013/0040173 A1 | 2/2013 | Yokoyama et al. | |
| 2013/0095356 A1* | 4/2013 | Shimizu | H01M 2/1077 429/88 |
| 2013/0252037 A1* | 9/2013 | Chiba | H01M 2/1241 429/53 |
| 2014/0065461 A1 | 3/2014 | Kountz et al. | |
| 2015/0132629 A1* | 5/2015 | Lee | H01M 2/1016 429/120 |

FOREIGN PATENT DOCUMENTS

| | | |
|---|---|---|
| JP | 2009-211907 A | 9/2009 |
| JP | 2010-97836 A | 4/2010 |
| JP | 2012-227079 A | 11/2012 |
| JP | 2013-165013 A | 8/2013 |
| JP | 2014-135247 A | 7/2014 |
| JP | 2015-530715 A | 10/2015 |
| WO | 2012/073432 A1 | 6/2012 |

OTHER PUBLICATIONS

International Search Report dated Mar. 14, 2017, issued in counterpart application No. PCT/JP2016/005173. (2 pages).
Office Action dated Mar. 19, 2020, issued in counterpart EP Application No. 16887848.6. (3 pages).

* cited by examiner

BATTERY PACK

TECHNICAL FIELD

The present invention relates to a battery pack formed by housing batteries in an outer case.

BACKGROUND ART

In recent years, demand for a repeatedly usable nickel hydride, nickel cadmium, or lithium ion secondary battery has increased from viewpoints of resource saving and energy saving. Above all, the lithium ion secondary battery has high electromotive voltage and high energy density in spite of being lightweight. Because of this, demand has expanded as a power supply for driving various kinds of portable electronic devices or mobile communication devices, such as a cell phone, a digital camera, a video camera, and a notebook type personal computer.

Meanwhile, with advancement of miniaturization and high energy density, there is a risk that a battery generates high-temperature heat depending on a way of utilization. As a result, safety of a battery and a battery pack becomes more important.

For example, when the above-described battery is overcharged or over-discharged, or internally short-circuited or externally short-circuited, gas may be generated inside. Then, the gas generated in this way increases internal pressure of the battery. When this situation occurs, there is a possibility that an outer can is ruptured due to an increase in the internal pressure. In order to prevent this rupture, these batteries are each provided with an exhaust hole, a safety valve, or the like for degassing.

Further, in a battery pack that houses these batteries in a case, a battery pack with a structure in which this gas is discharged to outside of the case has been also proposed to improve safety. Furthermore, there is a risk of causing fuming, ignition, or the like inside the battery pack due to an effect of, for example, an overheated battery, in a state in which this gas is generated.

A battery pack with a structure in which gas generated from a battery housed in a case is discharged to outside of the case has been developed. (refer to PTLs 1 and 2)

CITATION LIST

Patent Literature

PTL 1: Unexamined Japanese Patent Publication No. 2013-165013

PTL 2: Unexamined Japanese Patent Publication No. 2014-135247

SUMMARY OF THE INVENTION

A battery pack described in PTL 1 houses a plurality of batteries inside a closed case, and the case is provided with a communication part for guiding a jetting body, such as gas or flame, generated from these batteries to outside of the case. In this battery pack, the plurality of batteries is arranged in a row inside the case. Also, the communication part that allows a first space serving as an inside of the case and a second space serving as an outside of the case to communicate with each other is provided on one surface of the case and at a position away from a safety valve provided at each battery. This communication part includes a columnar part having a through-hole and a cover covering an opening edge to an outer peripheral surface of the columnar part. The communication part has a structure in which high-temperature gas or flame caused by ignition discharged from the through-hole is allowed to pass through inside of the cover and is discharged to the outside of the case.

The battery pack with this structure allows the jetting body, such as gas or flame, jetted from the battery to pass through the communication part. Accordingly, a distance to the outside of the case can be increased, and a harmful effect caused by the jetting body jetted to the outside can be suppressed. However, this battery pack cannot prevent catching fire between the plurality of batteries arranged in the case. As a result, when the battery is in an abnormal state and high-temperature gas or flame caused by ignition is generated, the plurality of batteries inside the case may be adversely affected.

In contrast, a battery pack described in PTL 2 is one part of a case and is provided with a cover at a portion that faces lid bodies having safety valves of a plurality of batteries. This cover is divided in a stacked direction of the batteries, and a gas guide that allows gas jetted from each battery to pass through is formed inside of the cover. Furthermore, in the cover, an opening opened by the gas jetted from the battery is formed facing each gas guide as an opening penetrating from an area inside the cover to outside.

Since the battery pack with this structure can jet a jetting body, such as gas or flame, jetted from the battery to the outside along the gas guide, catching fire between the adjacent batteries can be suppressed. However, in this battery pack, the high-temperature jetting body generated from each battery is directly jetted from the opening provided in the case to the outside of the case. Accordingly, the fire may be spread to the outside of the case, thereby causing a dangerous state.

The present invention is made in consideration of this background, and an object of the present invention is to provide a battery pack capable of effectively preventing a plurality of batteries from catching fire, while suppressing an effect on an outside of the battery pack caused by a jetting body, such as high-temperature gas or flame at ignition, jetted from the battery.

A battery pack of the present invention includes: a plurality of battery cells each formed by closing an opening of a bottomed cylindrical outer can with a sealing plate; a battery holder to hold the plurality of battery cells in a mutually parallel attitude and hold electrode terminals provided at both ends of each battery cell in an attitude disposing on a same plane; and an outer case to house a battery assembly formed by holding the plurality of battery cells in the battery holder. The battery holder includes: a holding part to hold the ends of the plurality of battery cells along outer peripheral surfaces of the outer cans; and the cover to cover an end surface side of the plurality of battery cells held by the holding part. When the battery cell is abnormal, the cover is deteriorated by energy of a jetting body jetted from an end surface of the battery cell.

In the present description, "a cover is deteriorated by energy of a jetting body jetted from a battery cell" means a state in which a cover is chemically or physically changed (specifically, melted, transformed, deformed, damaged, etc.) with high heat or wind pressure caused by a jetting body, such as gas or flame, jetted from a battery cell, thereby reducing energy of the jetting body jetted from the battery.

With the above-described configuration, even when the plurality of battery cells housed in the outer case becomes abnormal and high-temperature gas or flame caused by ignition jets out from the end surface of the battery cell, by deteriorating the cover disposed on the end surface side of the battery cells by the energy of the jetting body jetted from the battery cell, this energy is reduced. Accordingly, an adverse effect of the jetting body, such as gas or flame, on the outer case or the adjacent battery cell can be effectively suppressed. Particularly, interposition of the cover between the end surface of each battery cell and the outer case can effectively prevent the energy of the jetting body jetted from the battery cell from directly acting on the outer case. Even if flame etc. passes through the cover and reaches the outer case, the adverse effect on the outer case can be minimized by reducing the energy in the cover. Further, since the holding part holds the end of each battery cell along the outer peripheral surface of the outer can, the adjacent battery cell can be effectively prevented from catching fire.

In the battery pack of the present invention, the cover includes a cover area that faces the end surface of each battery cell. When the battery cell is abnormal, the cover area can be chemically or physically changed by the energy of the jetting body jetted from the end surface of the battery cell.

With the above-described configuration, when abnormality occurs in any of the battery cells and the jetting body is jetted from the end surface of the battery cell, the energy can be effectively reduced by chemically or physically changing the cover area of the cover systematically. Therefore, the adverse effect on the outer case and the adjacent battery cell can be effectively prevented.

In the battery pack of the present invention, a lead plate is connected to the electrode terminals at both the ends of the plurality of battery cells, and this lead plate can be sealed in the battery holder.

With the above-described configuration, while the lead plate is connected to the electrode terminals at both the ends of the plurality of battery cells, this connecting portion is sealed in the battery holder. Accordingly, the energy of the jetting body jetted from the end surface of the battery cell can be reliably absorbed by the cover.

In the battery pack of the present invention, the battery holder includes a pair of holder units to hold both the ends of the plurality of battery cells. The battery holder can hold the plurality of battery cells at fixed positions by coupling the pair of holder units.

With the above-described configuration, the pair of holder units holds both the ends of the plurality of battery cells, and the plurality of battery cells can be simply and easily disposed at fixed positions by coupling these holder units.

In the battery pack of the present invention, the holder unit forms the holding part and the cover separately. The holding part includes an end surface plate provided with a plurality of insertion parts held by inserting the ends of the plurality of battery cells. The cover includes a closing plate fixed by being stacked on an end surface plate. The insertion parts are insertion holes opened on the end surface plate. The end surface side of the battery cells inserted into the insertion holes can be covered with the closing plate.

With the above-described configuration, since the end surface plate, on which the plurality of insertion holes is opened, serves as the holding part, the holding part can be made lightweight and manufactured simply and inexpensively.

In the battery pack of the present invention, the holder unit forms the holding part and the cover separately. Holding The holding part includes the end surface plate provided with a plurality of insertion parts held by inserting the ends of the plurality of battery cells. The cover includes a closing plate fixed by being stacked on the end surface plate. The insertion parts are holding barrels coupled to the end surface plate, the holding barrels are coupled to insertion holes opened on the end surface plate, and the end surface side of the battery cells inserted into the holding barrels can be covered with the closing plate.

With the above-described configuration, since the holding barrels hold the ends of the plurality of battery cells, catching fire between the battery cells can be prevented more effectively while holding the plurality of battery cells at the fixed positions more reliably.

In the battery pack of the present invention, the holder unit can be formed by integrally molding the holding part and the cover.

With the above-described configuration, manufacturing processes and manufacturing cost can be reduced by integrally molding the holding part and the cover. Further, it is possible to suppress leakage of the jetting body jetted from the end surface of the battery cell, in which abnormality has occurred, from the holding part and the cover to the outside.

In the battery pack of the present invention, the holding part includes a battery housing part provided with a plurality of insertion parts housing the plurality of battery cells. The cover includes the closing plate fixed by being stacked on both end surfaces of the battery housing part. The insertion parts are insertion holes opened on the battery housing part or barrels forming the battery housing part, and the end surface side of the battery cells inserted into the insertion parts can be covered with the closing plate.

With the above-described configuration, since the battery cells are inserted into the insertion holes opened on the battery housing part and all the outer cans are covered with the battery housing part, the battery cell can be reliably prevented from catching fire from a side surface.

In the battery pack of the present invention, the holding part can include, on an outer surface in which the end surfaces of the plurality of battery cells are disposed, a recess disposed with the lead plate connected to the electrode terminals exposed from the insertion holes.

With the above-described configuration, since the lead plate connected to the electrode terminals exposed from the insertion holes is disposed in the recess provided on the outer surface of the holding plate, the lead plate can be disposed while positioning to the holding part. Further, since the closing plate is fixed to the holding part in a state in which the lead plate is disposed in the recess of the holding part, the lead plate can be sealed inside the battery holder with a simple structure.

In the battery pack of the present invention, the closing plate is formed with a fitting protrusion fitted into the recess on a surface facing the holding part.

With the above-described configuration, the fitting protrusion of the closing plate is fitted into the recess in a state in which the recess of the holding part is closed by the closing plate. Accordingly, the closing plate and the holding part are coupled more reliably. It is possible to suppress leakage of the jetting body jetted from the end surface of the battery cell, in which abnormality has occurred, from a boundary between the holding part and the cover to the outside.

In the battery pack of the present invention, the lead plate connects the plurality of adjacent battery cells in the recess, and the holding part can include a partition wall located between the battery cells connected to the lead plate and protruding from a bottom surface of the recess.

With the above-described configuration, since the partition wall protruding from the bottom surface of the recess is provided between the battery cells connected to the lead plate, the partition wall blocks the jetting body jetted from the end surface of the battery cell, in which abnormality has occurred, and catching fire between the battery cells can be effectively prevented.

In the battery pack of the present invention, the lead plate includes a plurality of connecting parts connected to the electrode terminals of the battery cells and a coupling part formed by coupling the plurality of connecting parts. A groove can be formed by bending the coupling part in a groove shape to guide the partition wall.

With the above-described configuration, the groove formed between the connecting parts of the lead plate is disposed on the partition wall. Accordingly, while the coupling part of the lead plate is disposed along the partition wall, the plurality of connecting parts is disposed approaching the electrode terminals of the battery cells and can be electrically connected to the electrode terminals of the battery cells reliably. Further, the lead plate can also be positioned at a fixed position by guiding the groove to the partition wall.

In the battery pack of the present invention, the lead plate includes a plurality of connecting parts connected to the electrode terminals of the battery cells and a coupling part formed by coupling the plurality of connecting parts. A groove can be formed by bending the coupling part in a groove shape to guide the partition wall.

With the above-described configuration, since the partition wall formed by crossing in a cross shape is formed in the recess disposed with the end surfaces of the battery cells arranged longitudinally and transversely, catching fire between these battery cells can be reliably prevented. Further, since the through-hole is opened on the lead plate at the position facing the crossing part, the plurality of grooves formed between the plurality of connecting parts can be simply and easily formed in directions crossing in a cross shape. Further, in this lead plate, since the groove in a crossing attitude is disposed on the partition wall crossing in the cross shape, the lead plate can be disposed at a correct position in the recess.

In the battery pack of the present invention, the cover includes a forming recess on a surface side of an area facing the end surface of each battery cell. A bottom surface of the forming recess is a cover area facing the end surface of the battery cell, and a thickness of the cover area can be adjusted by adjusting a depth of the forming recess.

With the above-described configuration, by adjusting the depth of the forming recess provided on the surface of the cover, the thickness of the cover area serving as a portion deteriorated by the energy of the jetting body jetted from the battery cell can be adjusted simply and easily.

In the battery pack of the present invention, a flameproof member formed in a sheet shape or a plate shape can be disposed on a surface of the battery assembly and on a surface side of the cover.

With the above-described configuration, when flame etc. jetted from the end surface of the battery cell passes through the cover, spreading fire to the outer case side can be effectively suppressed by the flameproof member.

In the battery pack of the present invention, the outer case includes support ribs protruding on inner surfaces of bottom surfaces. Surfaces of the covers can be separated from the bottom surfaces by abutting the support ribs on an end surface of the battery assembly.

With the above-described configuration, even when the cover is melted by a jetting body jetted from the battery cell, since an interval is provided between the bottom surface of the outer case and the cover, spreading fire to the outer case can be suppressed.

DESCRIPTION OF EMBODIMENTS

An exemplary embodiment of the present invention is described below with reference to the drawings. However, the exemplary embodiment described below shows a battery pack for embodying the technical ideas of the present invention. The battery pack of the present invention is not limited to the following. Further, in the present description, members shown in the scope of claims are not limited to the members of the exemplary embodiment. Especially, it is not intended that the scope of the present invention be limited only to the sizes, materials, and shapes of components and relative arrangement between the components described in the exemplary embodiment unless otherwise specified. The sizes and the like are mere explanation examples. The sizes and the positional relation of the members in each drawing are sometimes exaggerated for clearing the explanation. Furthermore, in the following explanation, the same names or the same reference marks denote the same members or same-material members, and detailed description is appropriately omitted. Furthermore, regarding the elements constituting the present invention, a plurality of elements may be formed of the same member, and one member may serve as the plurality of elements. Conversely, the function of one member may be shared by the plurality of members.

The battery pack of the present invention is mainly used as a power supply for power. This battery pack is used as a power supply of an electric motor device driven by a motor of an electric tool, an electric assist bicycle, an electric motorcycle, an electric wheelchair, an electric tricycle, or an electric cart, for example. However, a use of the battery pack is not specified in the present invention. The battery pack can be used as a power supply for various electrical devices other than the electric motor device, such as a cleaner, a radio, or a lighting device, used indoors or outdoors.

Figure 1:
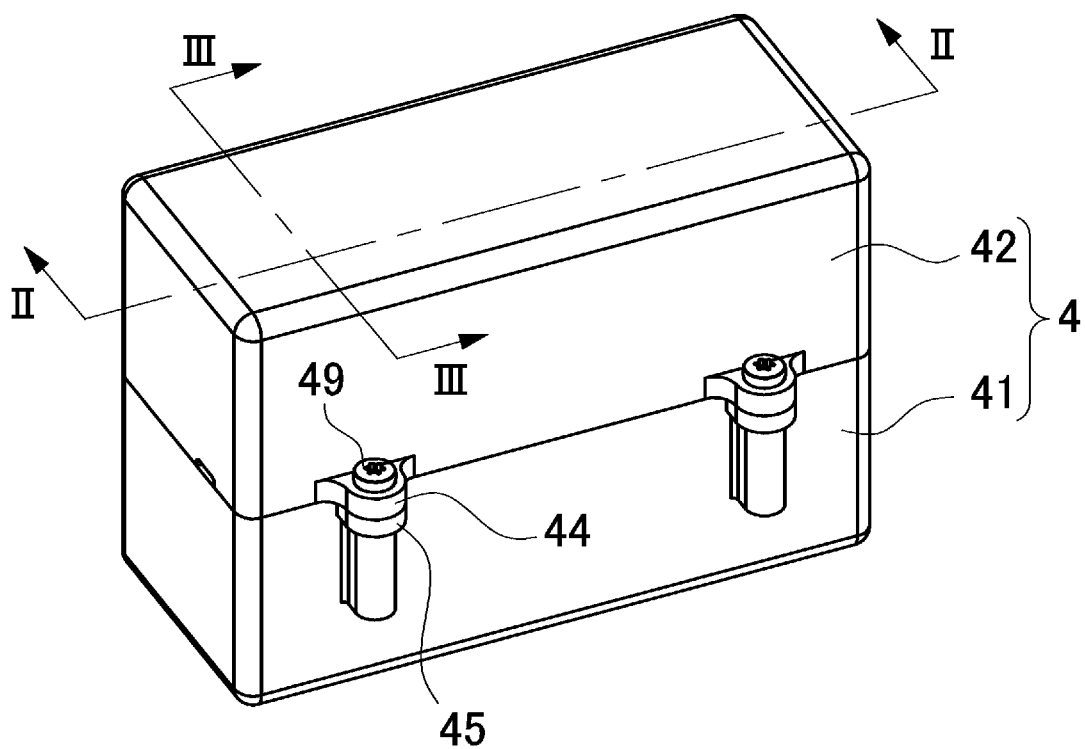
FIG. 1 is a perspective view of a battery pack according to one exemplary embodiment of the present invention.
Figure 2:
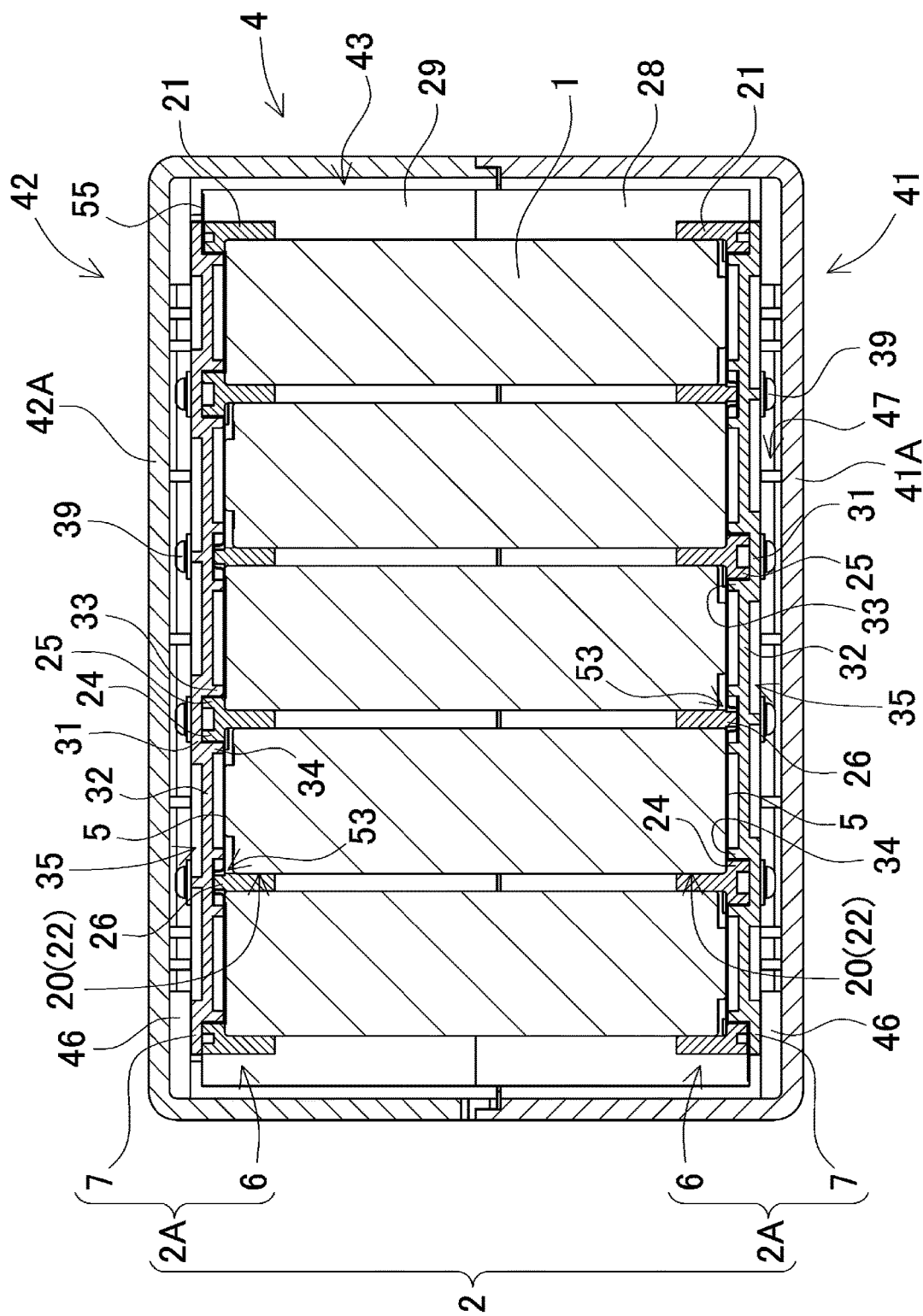
FIG. 2 is a sectional view of the battery pack illustrated in FIG. 1 taken along line II-II.
Figure 3:
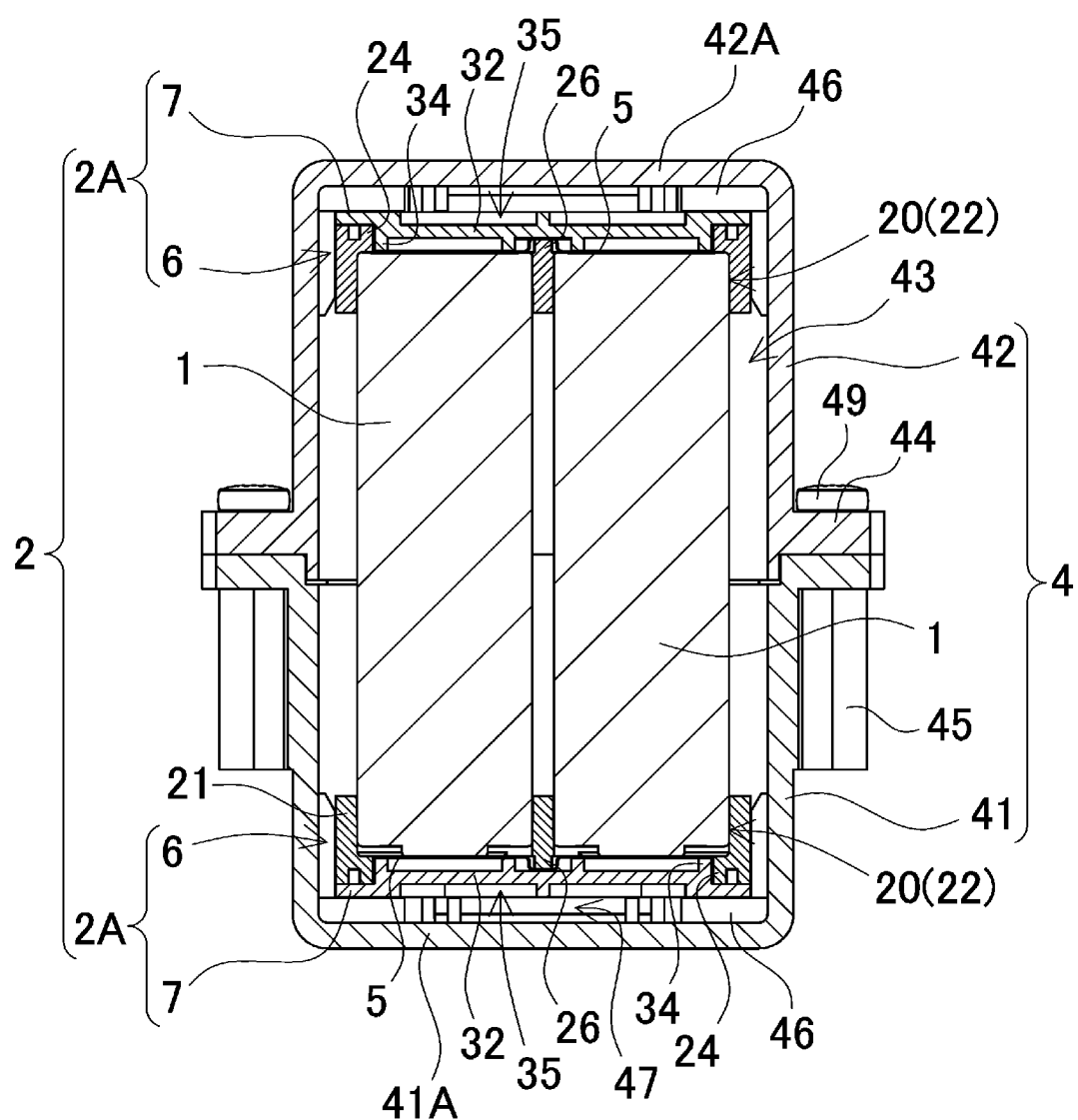
FIG. 3 is a sectional view of the battery pack illustrated in FIG. 1 taken along line III-III.
Figure 4:
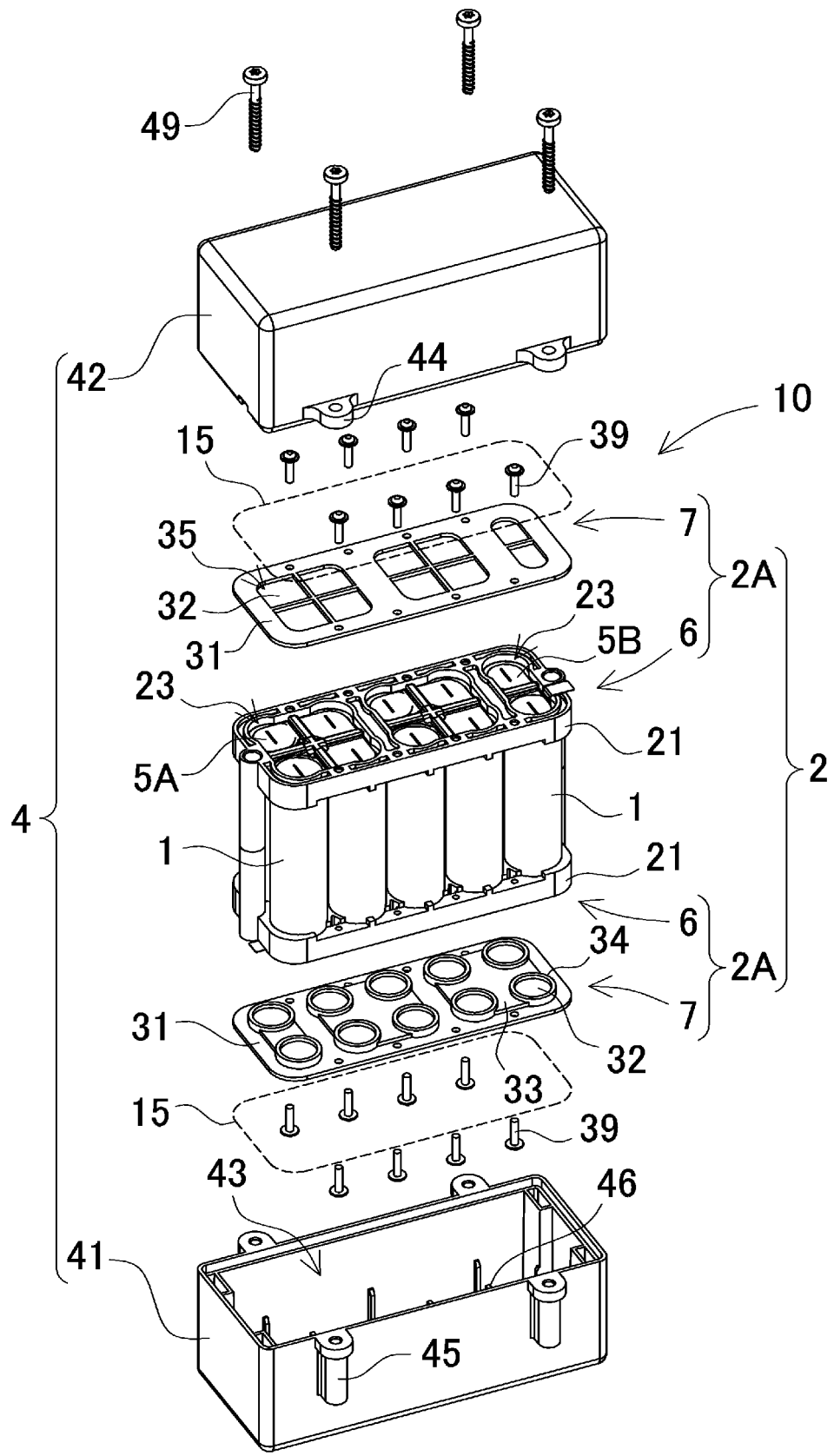
FIG. 4 is an exploded perspective view of the battery pack illustrated in FIG. 1.
Figure 5:
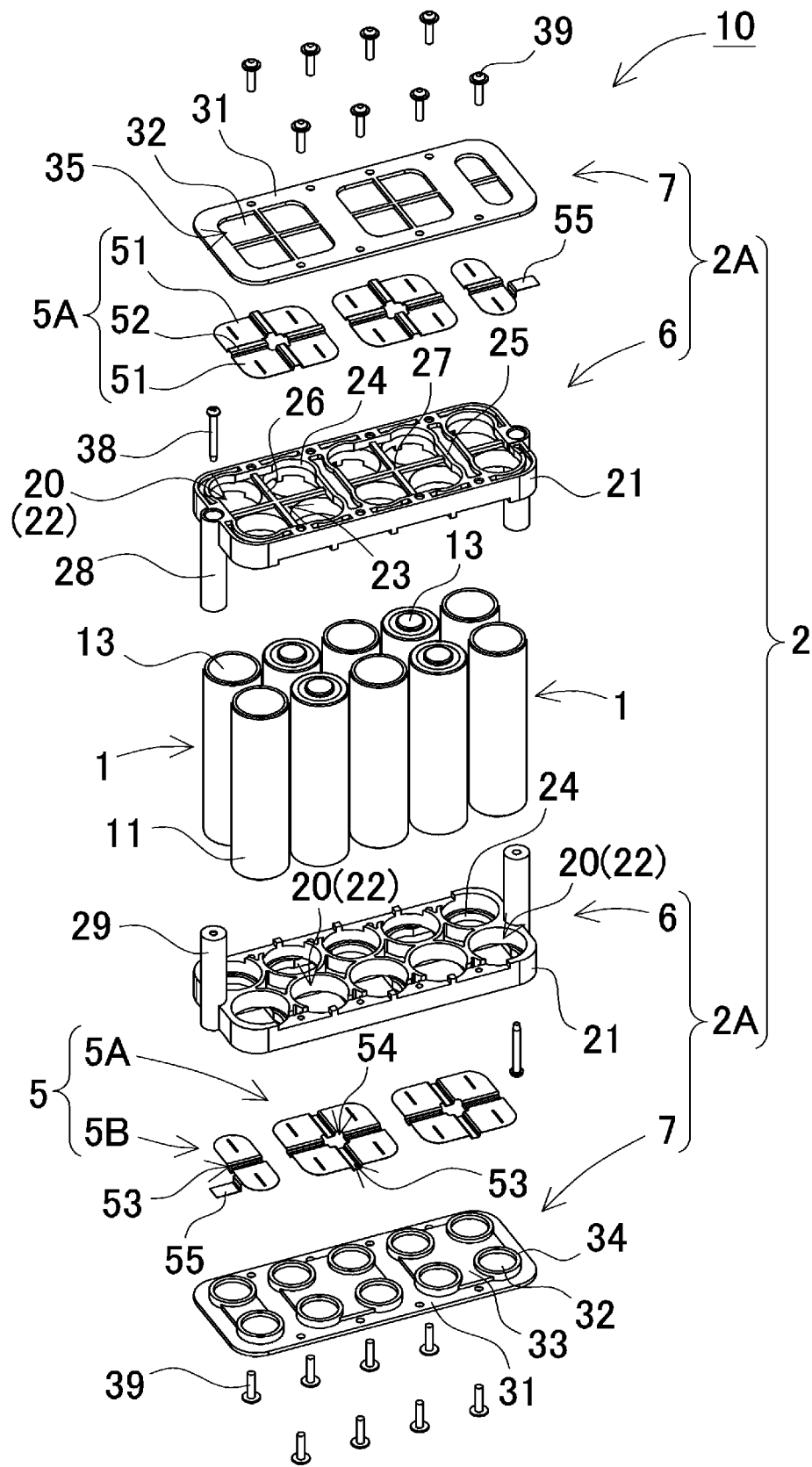
FIG. 5 is an exploded perspective view of a battery assembly illustrated in FIG. 4.
Figure 6:
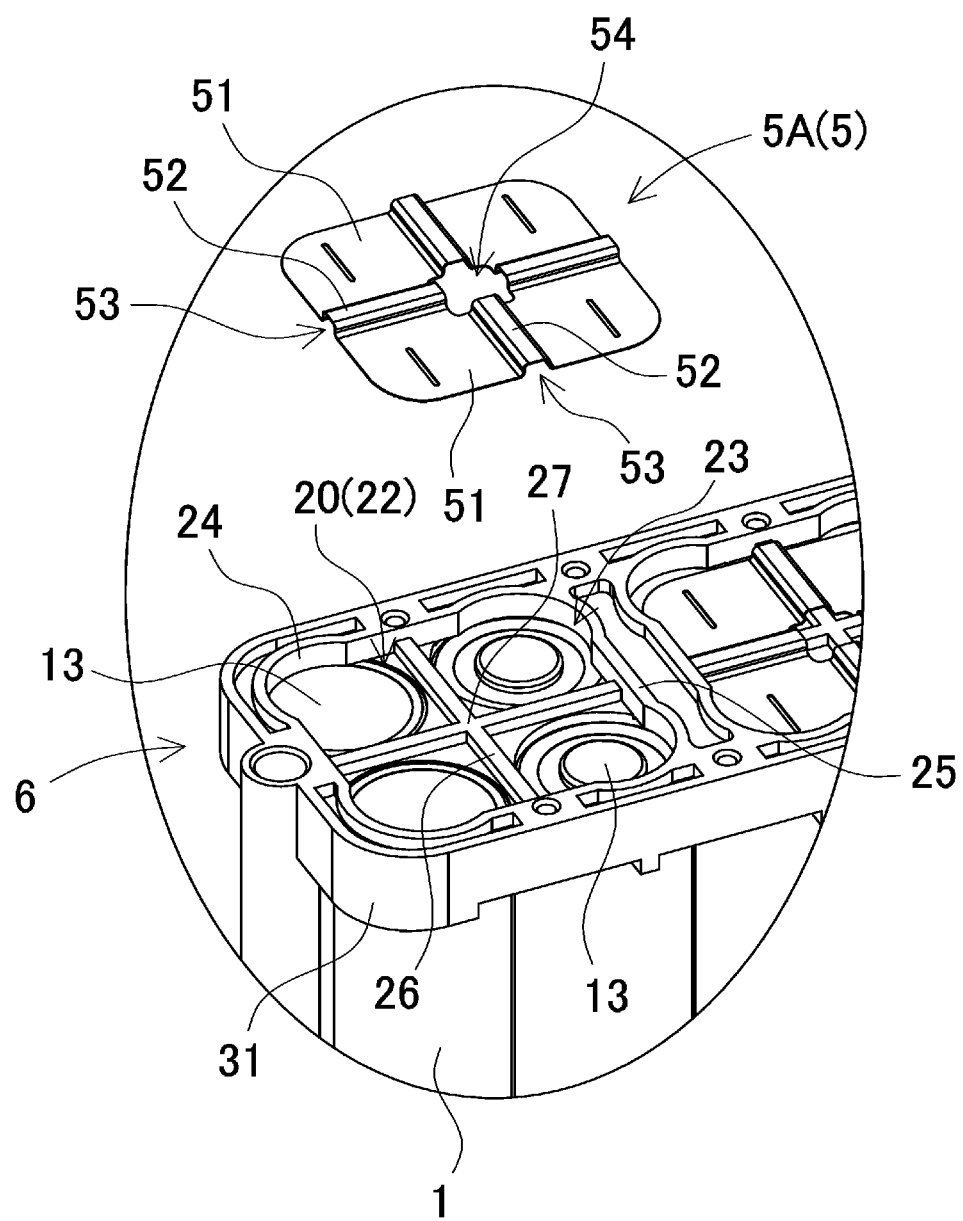
FIG. 6 is an enlarged exploded perspective view illustrating a holding part and a lead plate of a battery holder.

FIGS. 1 to 4 illustrate a battery pack according to a first embodiment of the present invention. In these drawings, FIG. 1 is a perspective view of a battery pack, FIG. 2 is a sectional view of the battery pack in FIG. 1 taken along line II-II, FIG. 3 is a sectional view of the battery pack in FIG. 1 taken along line III-III, FIG. 4 is an exploded perspective view of the battery pack in FIG. 1, FIG. 5 is an exploded perspective view of a battery assembly of the battery pack illustrated in FIG. 4, and FIG. 6 is an enlarged exploded perspective view of a recess and a lead plate of a battery holder. The battery pack illustrated in these drawings includes a plurality of battery cells 1 each formed by closing an opening of bottomed cylindrical outer can 11 with a sealing plate, battery holder 2 that holds the plurality of battery cells 1 at fixed positions in a mutually parallel attitude, and outer case 4 that houses battery assembly 10 formed by holding the plurality of battery cells 1 in battery holder 2.

(Battery Cell 1)

Battery cell 1 houses an electrode assembly in bottomed cylindrical outer can 11, is filled with electrolyte, and closes the opening of outer can 11 with the sealing plate. In battery cell 1, a bottom surface of outer can 11 and a protrusion electrode provided in a center of the sealing plate serving as both end surfaces are positive and negative electrode terminals 13. Battery cell 1 is a chargeable and dischargeable lithium ion secondary battery. However, the battery cell is not limited to the lithium ion secondary battery, and may be a chargeable and dischargeable battery, such as a nickel hydride battery or a nickel cadmium battery. Furthermore, the cylindrical battery is used in the battery pack of the present embodiment. However, the present invention is not limited to the cylindrical battery and can be a prismatic battery or a flat battery.

Furthermore, although not illustrated, battery cell 1 is provided with an exhaust port on the sealing plate provided with the protrusion electrode, and a safety valve is provided at this exhaust port. When internal pressure of the battery is increased by an overcharge or an internal short circuit, this battery cell 1 ensures safety by opening the safety valve and exhausting internal gas from the exhaust port. However, when abnormality occurs in the battery cell and the battery cell is further overheated, high-temperature gas or combustion flame may be jetted from inside. In this case, a jetting body, such as high-temperature gas or flame, is easily jetted from a battery end surface, particularly a sealing plate side provided with the exhaust port, of battery cell 1.

According to the battery pack of the present invention, even when abnormality occurs in a part of battery cell 1 and a high-temperature jetting body is jetted from the battery end surface, battery holder 2 holding the plurality of battery cells 1 has a unique structure to prevent fire from spreading to an outside of outer case 4 or to prevent adjacent battery cell 1 from catching fire. Battery holder 2 is described below in detail.

(Battery Holder 2)

Battery holder 2 illustrated in FIGS. 2 to 5 holds the plurality of battery cells 1 in the mutually parallel attitude and holds electrode terminals 13 provided at both ends of each battery cell 1 in an attitude disposing on a same plane at fixed positions. Battery holder 2 illustrated in FIGS. 4 and 5 includes holding part 6 to hold the end of battery cell 1 along an outer peripheral surface of outer can 11 and cover 7 to cover an end surface side of battery cell 1 held by this holding part 6. Battery holder 2 illustrated in FIGS. 4 and 5 includes a pair of holder units 2A to hold both the ends of the plurality of battery cells 1. Each holder unit 2A is configured with holding part 6 and cover 7. Note that the pair of holder units 2A illustrated in FIG. 5 allows the plurality of battery cells 1 to be connected in series and in parallel numerously by inverting a same structure of holder unit 2A vertically and horizontally.

(Holding Part 6)

As illustrated in FIGS. 2 to 5, holding part 6 includes end surface plate 21 to hold the ends of the plurality of battery cells 1. Holding parts 6 in the drawings are located at both the ends of the plurality of battery cells 1 and disposed in a mutually parallel attitude. As illustrated in FIG. 5, holding part 6 includes a plurality of insertion parts 20 held by inserting the ends of battery cells 1 in end surface plate 21. Insertion part 20 illustrated in the drawing is insertion hole 22 opened on end surface plate 21. This insertion hole 22 has a shape along an outer peripheral surface of battery cell 1. Preferably, insertion hole 22 has a structure capable of approaching or touching the outer peripheral surface of battery cell 1 and of coupling to battery cell 1 without making a gap between insertion hole 22 and the outer peripheral surface of battery cell 1. In a state in which the end of battery cell 1 is inserted into insertion hole 22 from an inner surface, end surface plate 21 allows electrode terminal 13 to be exposed from an opening of an outer surface serving as an opposite side. Furthermore, an inner shape of a side, from which electrode terminal 13 is exposed, of insertion hole 22 is partially made smaller than an outer shape of outer can 11, thereby forming stopper 24 to prevent passage of battery cell 1. With this configuration, the end of battery cell 1 inserted into insertion hole 22 can be stopped at a fixed position of insertion hole 22 without penetrating end surface plate 21.

Moreover, holding part 6 illustrated in FIGS. 4 to 6 is formed with recess 23 on an outer surface, on which the end surfaces of the plurality of battery cells 1 are disposed. Lead plate 5 connected to electrode terminals 13 exposed from insertion holes 22 is disposed in recess 23. Holding part 6 illustrated in the drawings is formed with a plurality of recesses 23 on the outer surface of end surface plate 21 and is provided with insulating wall 25 at a boundary portion between adjacent recesses 23. This insulating wall 25 insulates adjacently disposed lead plates 5, and blocks spreading of a jetting body jetted from the end surface of battery cell 1, in which abnormality has occurred, to adjacent recess 23, thereby suppressing catching fire between adjacent recesses 23.

Furthermore, holding part 6 illustrated in the drawings includes partition wall 26 that protrudes from a bottom surface of recess 23. Partition wall 26 is located between the plurality of insertion holes 22 opened inside recess 23, that is, located between battery cells 1 connected to lead plate 5 disposed in recess 23. Among three recesses 23 formed on end surface plate 21 of holding part 6 illustrated in the drawings, partition wall 26 with crossing part 27 crossing in a cross shape is formed in a center of recess 23 where the end surfaces of four battery cells 1 are disposed, and linear partition wall 26 is formed in a center of recess 23 where the end surfaces of two battery cells 1 are disposed. Heights of partition walls 26 are formed lower than depths of recesses 23. These partition walls 26 block spreading of a jetting body jetted from the end surface of battery cell 1, in which abnormality has occurred, to the end surface of adjacent battery cell 1, thereby suppressing catching fire between adjacent batteries 1.

In holding part 6 illustrated in FIGS. 4 and 5, the end surfaces of two or four battery cells 1 are disposed in one recess 23. However, in holding part 6, a number of battery cells 1 disposed in one recess 23 is not limited. In holding part 6, the number of battery cells 1 disposed in one recess 23 can be changed variously depending on the number or a connection state of battery cells 1 to be held. For example, end surfaces of six battery cells can be disposed in one recess. In this recess, a partition wall having a plurality of crossing parts is formed, and the recess can be partitioned into six areas.

(Cover 7)

Cover 7 covers the end surface side of the plurality of battery cells 1 held by holding part 6. When battery cell 1 is abnormal, cover 7 is deteriorated by energy of a jetting body jetted from the end surface of battery cell 1. This cover 7 is chemically or physically changed by the energy of the jetting body jetted from battery cell 1, thereby reducing energy. Specifically, since cover 7 is melted, transformed, deformed, damaged, etc. by the energy of the jetting body jetted from battery cell 1, the energy of the jetting body jetted from battery cell 1 is reduced. In other words, the energy is consumed and reduced by melting or transforming cover 7 with thermal energy of jetted flame. Alternatively, the energy is consumed and reduced by deforming or damaging the cover with high heat, wind pressure, etc.

Cover 7 includes cover area 32 that faces the end surface of each battery cell 1. Cover area 32 is chemically or physically changed by a high-temperature jetting body jetted from battery cell 1. This cover 7 consumes energy by melting or deforming cover area 32 with the high-temperature jetting body. This cover 7 can adjust an energy consumption state by cover 7 by adjusting a thickness of cover area 32. Therefore, cover area 32 of cover 7 has a thickness in which cover area 32 is chemically or physically changed by the energy of the jetting body jetted from the end surface of battery cell 1, that is, a thickness in which cover area 32 is melted or deformed by the energy of the jetting body jetted from battery cell 1, when battery cell 1 is abnormal.

Cover 7 illustrated in FIGS. 2 to 5 includes closing plate 31 fixed by being stacked on end surface plate 21. Closing plate 31 in the drawings includes cover area 32 that faces the end surface of each battery cell 1 in a center. Closing plate 31 illustrated in the drawings is provided with forming recess 35 on a front surface side of cover area 32. A surface that is one step lower than a surface of closing plate 31 serves as cover area 32. In this structure, the thickness of cover area 32 can be easily adjusted by adjusting a depth of forming recess 35. An outer peripheral edge of closing plate 31 illustrated in the drawings is fixed to end surface plate 21 with an outer shape of closing plate 31 substantially equal to an outer shape of end surface plate 21. Closing plate 31 illustrated in the drawings is fixed to end surface plate 21 via a plurality of setscrews 39 penetrating through the outer peripheral edge. Since closing plate 31 can be firmly fixed to end surface plate 21 in this structure, closing plate 31 can be effectively prevented from being separated from end surface plate 21 by wind pressure etc., when a large amount of gas is instantaneously jetted from battery cell 1 due to abnormality of battery cell 1. However, closing plate 31 can be fixed to end surface plate 21 by a locking structure, an adhesive, etc. or a combination of the locking structure, the adhesive, etc.

Furthermore, closing plate 31 is formed with fitting protrusion 33 fitted into recess 23 on a surface facing holding part 6. Fitting protrusion 33 illustrated in the drawings has an outer shape substantially equal to an inner shape of recess 23 formed on end surface plate 21. By making fitting protrusion 33 of closing plate 31 fit into recess 23 in a state in which end surface plate 21 is closed by closing plate 31, closing plate 31 and holding part 6 can be coupled without a gap. This structure can suppress leakage of a jetting body jetted from the end surface of battery cell 1, in which abnormality has occurred, from a boundary between holding part 6 and cover 7 to the outside.

Furthermore, closing plate 31 illustrated in FIG. 5 is provided with ring-shaped projecting strip 34 on a surface of fitting protrusion 33 and at a position facing the end surface of battery cell 1. Ring-shaped projecting strip 34 illustrated in FIG. 5 has an outer shape, which is a circular shape, along an inner shape of stopper 24 provided in insertion hole 22 of end surface plate 21.

By coupling ring-shaped projecting strip 34 to the inner surface of stopper 24 without a gap, this closing plate 31 can suppress leakage of a jetting body jetted from the end surface of battery cell 1 from a portion between ring-shaped projecting strip 34 and stopper 24 to the outside.

In above-described battery holder 2, lead plate 5 is connected to electrode terminals 13 of battery cells 1 exposed from insertion holes 22 in recess 23 of end surface plate 21, and closing plate 31 is stacked on the outer surface of end surface plate 21 and fixed. Lead plate 5 is clamped between end surface plate 21 and closing plate 31 in this state and sealed in battery holder 2.

Battery holder 2 is molded from a resin, such as a thermoplastic resin, serving as an insulation material. Battery holder 2 can be preferably made of resin having excellent flame retardance. For example, polycarbonate (PC) or polypropylene (PP) can be used for such resin. In battery holder 2 illustrated in the drawings, both holding part 6 and cover 7 are molded from the resin. In battery holder 2 made of resin, holding part 6 and cover 7 can be molded separately or integrally.

Cover 7 made of resin adjusts the energy consumption state of the jetting body jetted from battery cell 1 by adjusting the thickness of cover area 32 facing the end surface of battery cell 1. By thickening cover area 32, cover 7 can effectively prevent spreading of flame to outer case 4. Further, by thinning cover area 32, cover 7 is easily deteriorated by the energy of the flame and can prevent adjacent battery cell 1 from catching fire. Therefore, cover 7 is designed to have an optimal thickness in consideration of these cases. For example, cover 7 is designed to have the optimal thickness depending on a type and a capacity of battery cell 1 to be used, a material of resin used for cover 7, etc. In cover 7, for example, when a lithium ion secondary battery having a capacity of 4 Ah is used for battery cell 1 and cover 7 is molded from polycarbonate, the thickness of cover area 32 ranges from 0.5 mm to 3.0 mm. Accordingly, the energy of the jetting body can be efficiently reduced.

However, the holding part can be made of resin and the cover can be made of metal in the battery holder. The cover made of metal can be a metal plate having a predetermined thickness. Iron, aluminum, copper, etc. can be used for such a metal plate. The cover formed of the metal plate can be insulated by applying insulation coating to a surface. The cover formed of the metal plate also has a thickness in which the cover is melted or deformed by the energy of the jetting body jetted from the battery cell.

Above-described battery holder 2 couples the pair of holder units 2A and holds battery cells 1 at fixed positions in a state in which holding part 6 of each holder unit 2A holds the ends of battery cells 1, that is, in a state in which both the ends of battery cells 1 are inserted into insertion holes 22 provided in facing end surface plates 21. The pair of holder units 2A is coupled and fixed by inserting coupling screw 38 through first boss 28 provided at an end of one end surface plate 21 and screwing coupling screw 38 into second boss 29 provided at an end of other end surface plate 21. However, the pair of holder units can be coupled by a locking structure, coupled by adhesion, or coupled by combining the locking structure and adhesion.

In holding part 6 of above-described battery holder 2, the plurality of insertion holes 22 is opened and provided in end surface plate 21 to insert and hold the ends of battery cells 1. In this battery holder 2, battery cells 1 are disposed at fixed positions by holding both the ends of the plurality of battery cells 1 by the pair of holder units 2A. In this battery holder 2, battery cells 1 are held at the fixed positions in a state in which an intermediate portion of each battery cell 1 is exposed without being covered. This battery holder 2 has a simple structure and can be made lightweight.

(Another Example of Holding Part)

Figure 7:
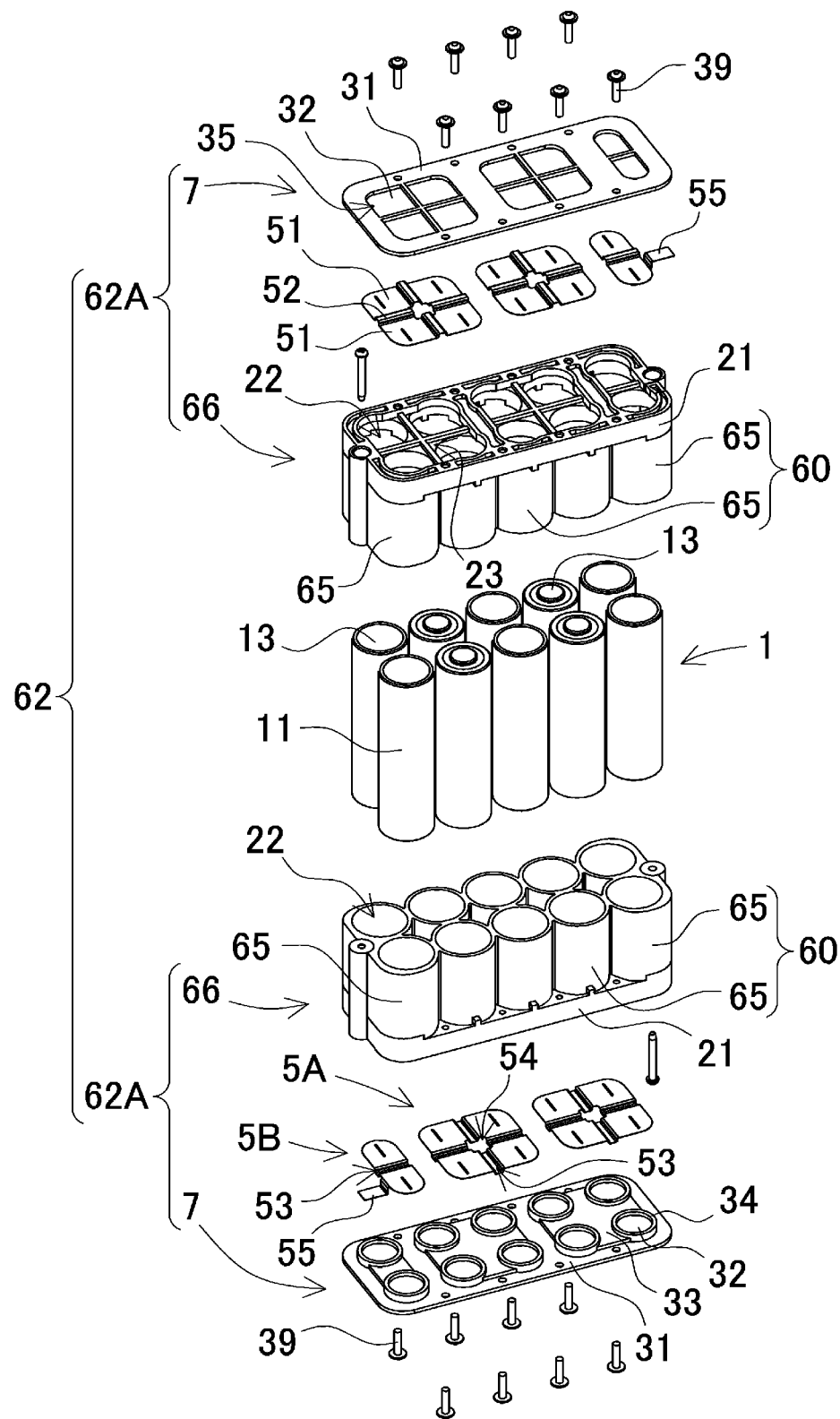
FIG. 7 is an exploded perspective view of a battery pack according to another embodiment of the present invention.

Furthermore, as illustrated in FIG. 7, a battery holder configured with a pair of holder units can include a plurality of holding barrels (=pipes) 65 as a plurality of insertion parts 60 housing ends of a plurality of battery cells 1. Battery holder 62 illustrated in FIG. 7 includes a pair of holder units 62A. Each holder unit 62A includes holding part 66 and cover 7 formed separately. Herein, cover 7 can have a same structure as the structure of the above-described cover. Therefore, same configuration elements as configuration elements of above-described holder unit 2A are identified by the same reference marks, and the detailed description of the configuration elements is omitted.

Holding part 66 illustrated in FIG. 7 includes the plurality of holding barrels 65 housing the ends of the plurality of battery cells 1 and end surface plate 21 formed by coupling the plurality of holding barrels 65. In this holding part 66, holding barrels 65 are integrally molded and coupled to plate-shaped end surface plate 21 as a plurality of holding parts 66. Holding barrels 65 are coupled to end surface plate 21 in an orthogonal attitude. Furthermore, holding part 66 respectively couples the plurality of holding barrels 65 to insertion holes 22 opened on end surface plate 21. An inner shape of holding barrel 65 is substantially equal to an outer shape of battery cell 1 such that battery cell 1 can be inserted into holding barrel 65.

Furthermore, in battery holder 62 in the drawing, a length of holding barrel 65 formed in each holder unit 62A is substantially a half of an entire length of battery cell 1 such that a whole of battery cell 1 can be covered with holding barrels 65. The whole of battery cell 1 is covered with the pair of holding barrels 65 in a state in which the pair of holder units 62A is mounted from both the ends of battery cells 1 and coupled to each other. In this way, a structure in which the whole of battery cell 1 is covered with holding barrels 65 can effectively prevent catching fire between adjacent battery cells 1. However, it is not always necessary that the whole of battery cell is covered with the holding barrels in the battery holder. For example, a holding barrel can have a structure in which both the ends of the battery cell are partially covered. The holding barrel covers 1/10 to 1/2, preferably 1/6 to 1/2, of an area of the whole battery cell, and reliably holds the ends of the battery cell. Accordingly, catching fire can be suppressed.

(Another Example of Holder Unit)

Figure 8:
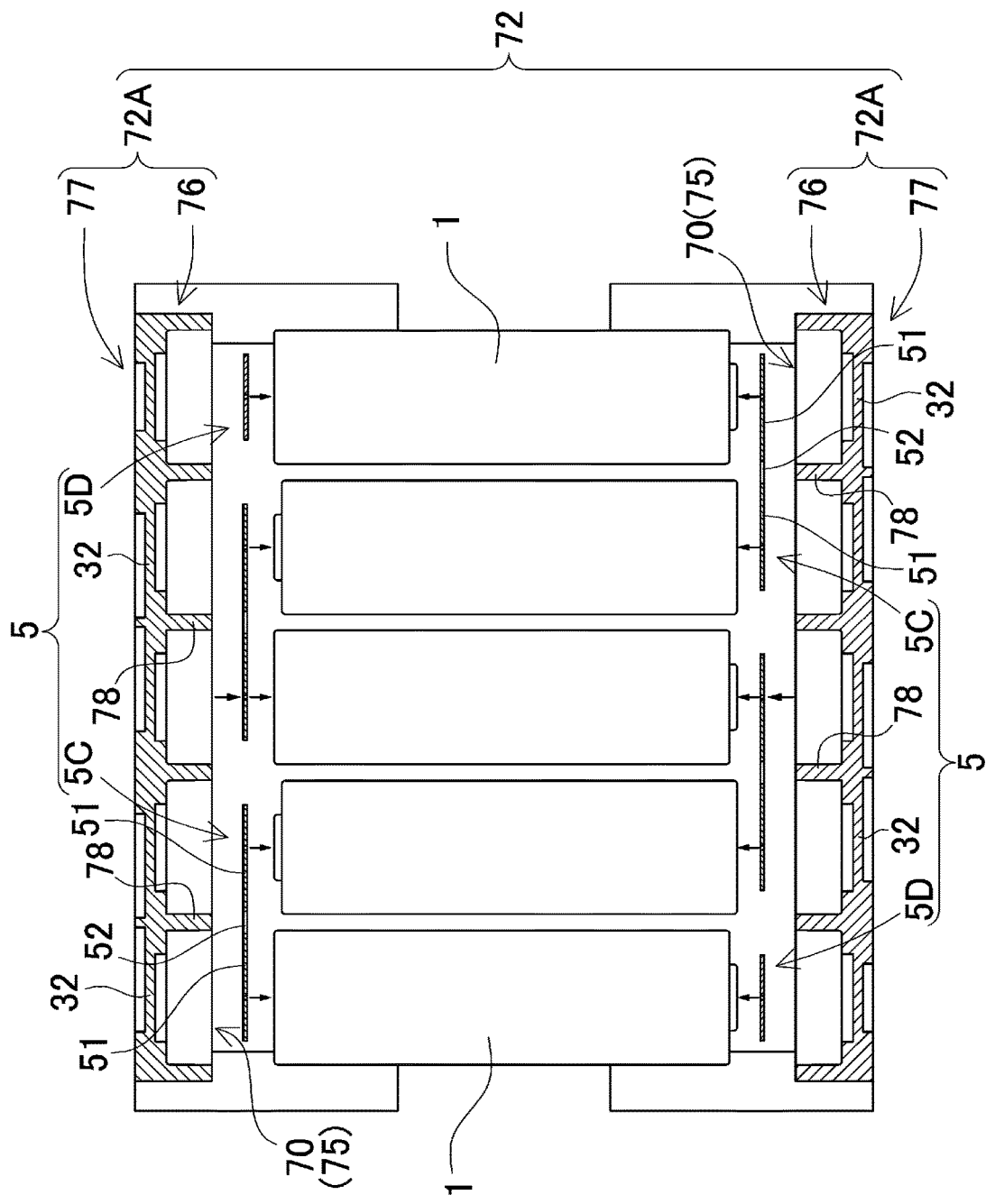
FIG. 8 is an exploded sectional view of a battery pack according to another embodiment of the present invention.

Furthermore, a battery holder configured with a pair of holder units can have a structure illustrated in FIG. 8. Battery holder 72 illustrated in FIG. 8 includes a pair of holder units 72A. Each holder unit 72A includes holding part 76 and cover 77 that are integrally molded. Holding part 76 includes a plurality of insertion parts 70 held by inserting ends of battery cells 1. Insertion part 70 illustrated in the drawing is insertion recess 75 opened on plate-shaped holding part 76. This insertion recess 75 has an inner shape along an outer peripheral surface of battery cell 1. Preferably, insertion recess 75 has a structure capable of approaching or touching the outer peripheral surface of battery cell 1 and coupling to battery cell 1 without making a gap between insertion recess 75 and the outer peripheral surface of battery cell 1. However, this holding part can also include a holding barrel as an insertion part.

Furthermore, an outer surface serving as an opposite side surface of holding part 76 is closed by cover 77. Cover 77 illustrated in FIG. 8 includes cover area 32. This cover area 32 is deteriorated by energy of a jetting body jetted from battery cell 1.

Since this battery holder 72 is sealed by integrally molding cover 77 with holding part 76, lead plate 5 connected to battery cell 1 is inserted into battery holder 72 from an opening of insertion part 70. At this time, as illustrated in FIG. 8, lead plate 5C formed by connecting the plurality of battery cells 1 includes coupling part 52 formed between connecting parts 51. Accordingly, this coupling part 52 abuts on boundary wall 78 formed between battery cells 1 and becomes obstructive. Therefore, in this battery holder 72, a slit (not illustrated) that allows passage of coupling part 52 of lead plate 5 is provided on boundary wall 78 formed between battery cells 1. With this configuration, lead plate 5C is inserted into battery holder 72 in which holding part 76 and cover 77 are integrally molded. Furthermore, lead plate 5D including an output lead for outputting (not illustrated) is connected to both ends of the plurality of battery cells 1 mutually connected in series. When this lead plate 5D is inserted into battery holder 72, the output lead also becomes obstructive. Accordingly, in battery holder 72, a slit (not illustrated) that allows passage of the output lead of lead plate 5D is provided in holding part 76.

(Another Example of Battery Holder)

Figure 9:
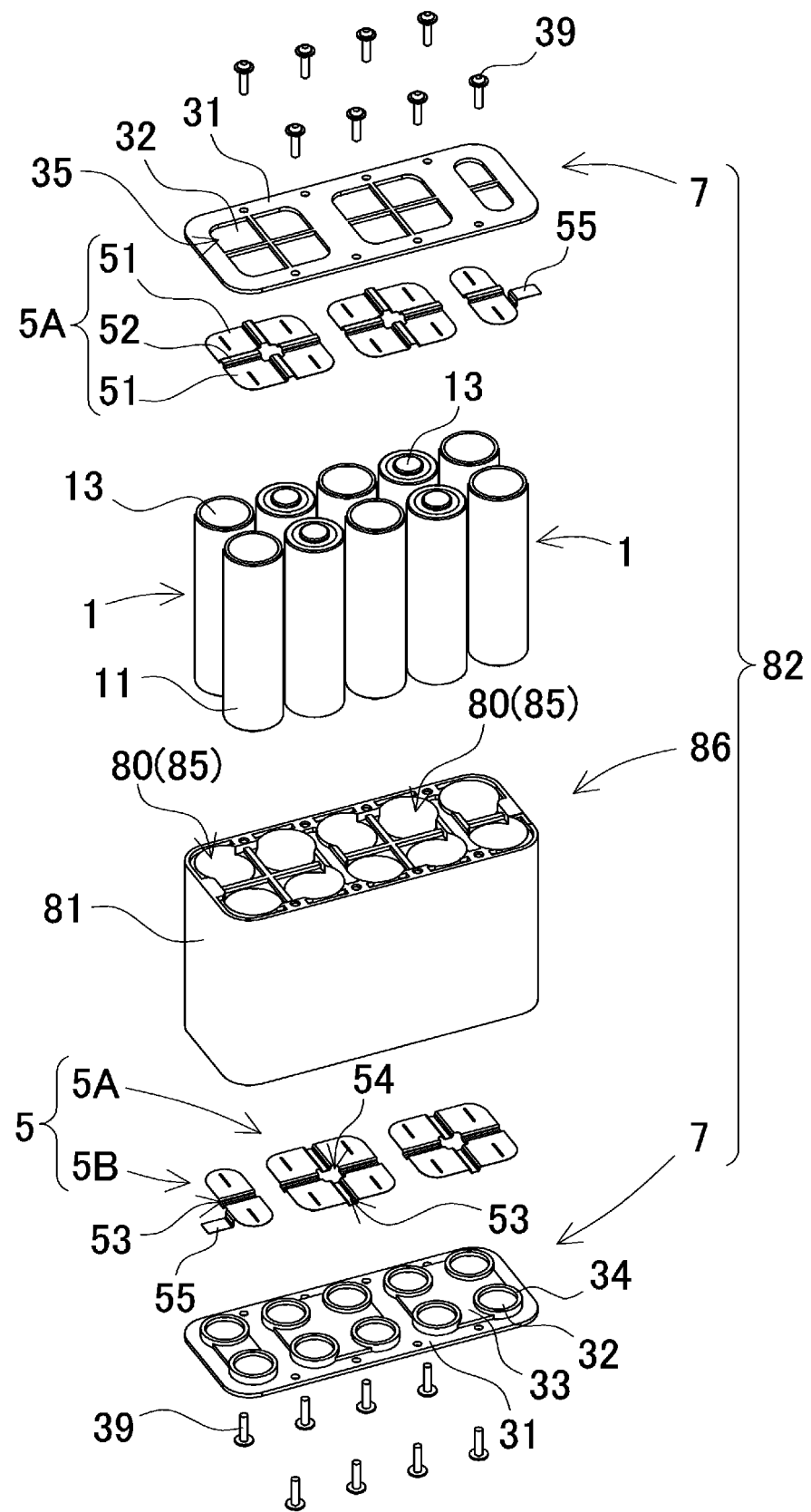
FIG. 9 is an exploded perspective view of a battery pack according to another embodiment of the present invention.

The above-described battery holder is configured with the pair of holder units. However, as illustrated in FIG. 9, a battery holder can be configured with holding part 86 that houses and holds all battery cells 1 and cover 7 disposed on both end surfaces of this holding part 86. In battery holder 82 illustrated in the drawing, holding part 86 includes battery housing part 81 having a plurality of insertion parts 80 that houses a plurality of battery cells 1, and cover 7 includes closing plate 31 fixed by being stacked on both end surfaces of battery housing part 81. This cover 7 can also have a same structure as the structure of the above-described cover.

In holding part 86 in FIG. 9, insertion part 80 that houses battery cell 1 is formed as insertion hole 85 opened on battery housing part 81. A whole of battery housing part 81 illustrated in the drawing is formed in a block shape, and a through-hole capable of inserting battery cell 1 is opened to form insertion hole 85. In this holding part 86, in a state in which battery cells 1 are inserted into insertion holes 85 opened on battery housing part 81, both the end surfaces of battery housing part 81 are closed by covers 7 formed with closing plates 31, and the end surface sides of battery cells 1 are covered with covers 7.

Furthermore, although not illustrated, the holding part that houses the plurality of battery cells can form a battery housing part capable of housing the battery cells in a plurality of barrels. This battery housing part is formed in a shape formed by coupling the plurality of barrels in a parallel attitude. Both end surfaces of the battery housing part formed with the plurality of barrels are also closed by covers, such as closing plates, thereby covering end surface sides of the battery cells.

As described above, in holding part 86 of battery holder 82 having a structure in which battery housing part 81 includes insertion holes 85 or the barrels capable of housing all battery cells 1, battery cells 1 are respectively inserted into insertion holes 85 or the barrels, and all outer cans 11 are covered with battery housing part 81. Accordingly, battery cell 1 can be prevented from catching fire from a side surface.

(Lead Plate 5)

Lead plates 5 are disposed in recesses 23 formed in holding part 6 and connected to electrode terminals 13 of the plurality of battery cells 1. Lead plates 5 are connected to electrode terminals 13 of battery cells 1 by welding, such as spot welding or laser welding. A material having good electric conductivity and thermal conductivity is used for lead plate 5, and preferably, a metal plate, such as an iron plate whose surface is plated with nickel, etc., a nickel plate, a copper plate, or an aluminum plate, can be used. In battery holder 2 in the drawings, three lead plates 5 are disposed on end surface plate 21 of each holder unit 2A and connected to electrode terminals 13 of battery cells 1.

Lead plate 5 illustrated in FIGS. 4 to 6 connects the plurality of battery cells 1 disposed in multiple stages and multiple rows, in series and parallel. In order to connect the plurality of battery cells 1 in series and parallel, lead plate 5 in the drawings includes a plurality of connecting parts 51 connected to electrode terminals 13 of battery cells 1 and coupling part 52 formed by coupling the plurality of connecting parts 51. Lead plate 5 illustrated in the drawings includes lead plate 5A and lead plate 5B. Lead plate 5A connects four battery cells 1 disposed in two stages and two rows, in two series and two parallels. Lead plate 5B is connected to the both ends of the plurality of battery cells 1 mutually connected in series and connects two battery cells 1 in parallel.

Lead plate 5A includes four connecting parts 51 disposed facing electrode terminals 13 of four battery cells 1 disposed in two stages and two rows. These connecting parts 51 are coupled by four coupling parts 52 provided between adjacent connecting parts 51. Further, lead plate 5B includes two connecting parts 51 disposed facing electrode terminals 13 of two battery cells 1. These connecting parts 51 are coupled by coupling part 52 provided between adjacent connecting parts 51. Furthermore, lead plate 5B includes output lead 55 for outputting. Output lead 55 provided in lead plate 5B is extracted to the outside from a space between holding part 6 and cover 7. Although not illustrated, output lead 55 extracted from battery holder 2 is extracted to the outside of outer case 4 via a lead plate for outputting.

Furthermore, in order to guide partition wall 26 formed in recess 23, lead plate 5 illustrated in the drawings is formed with groove 53 by bending coupling part 52 provided between connecting parts 51 into a groove shape. Lead plate 5B is formed with linear groove 53 between two connecting parts 51, and this groove 53 can guide partition wall 26. Lead plate 5A is formed with four grooves 53 between four connecting parts 51. These grooves 53 are formed in directions crossing in a cross shape and can guide partition walls 26 crossing in the cross shape. Furthermore, through-hole 54 is opened on lead plate 5A at a position facing crossing part 27 of crossing partition walls 26. Since through-hole 54 is opened on this lead plate 5A at the position facing crossing part 27, a plurality of grooves 53 can be easily formed in the directions crossing in the cross shape. In above-described lead plate 5, groove 53 provided between connecting parts 51 is disposed on partition wall 26. Accordingly, while coupling part 52 of lead plate 5 is disposed along partition wall 26, the plurality of connecting parts 51 can be approached and electrically connected to electrode terminals 13 of battery cells 1 reliably. Further, lead plate 5 can be positioned at a fixed position by guiding groove 53 to partition wall 26.

Lead plate 5A illustrated in the drawings connects electrode terminals 13 of four battery cells 1 disposed in two stages and two rows. However, a number of batteries disposed in multiple series and multiple parallels is not limited. The lead plate can also connect six battery cells disposed in three stages and two rows, or eight battery cells disposed in four stages and two rows.

(Battery Assembly 10)

In battery holder 2 illustrated in FIGS. 1 to 6, holding part 6 holds the plurality of battery cells 1 at the fixed positions, electrode terminals 13 of the plurality of battery cells 1 disposed in recess 23 provided in holding part 6 are connected with lead plate 5, closing plate 31 is fixed to the surface of holding part 6, and the end surface side of battery cells 1 is covered with cover 7. Accordingly, battery assembly 10 is formed.

In battery assembly 10 illustrated in FIGS. 1 to 6, the plurality of battery cells 1 in the parallel attitude is arranged in multiple stages and multiple rows and disposed at the fixed positions in battery holder 2. In the battery pack in the present embodiment, ten battery cells 1 are arranged in two stages and five rows, and these battery cells 1 are electrically connected in five series and two parallels. However, in the present invention, a number of battery cells 1 to be housed is not limited. Further, a structure in which battery cells 1 are arranged in multiple stages and multiple rows is not also limited. For example, a plurality of battery cells can be arranged in one stage in the battery pack.

(Outer Case 4)

As illustrated in FIGS. 1 to 4, outer case 4 houses battery assembly 10 formed by disposing the plurality of battery cells 1 at the fixed positions in battery holder 2. Outer case 4 illustrated in the drawings is divided into first case 41 and second case 42, and housing part 43 that houses battery assembly 10 is formed inside outer case 4. First case 41 and second case 42 illustrated in the drawings are each formed in a box shape having a depth capable of housing substantially half of battery assembly 10. Battery assembly 10 is housed inside this outer case 4 in a state of being sandwiched from both sides by first case 41 and second case 42.

In order to couple second case 42 to first case 41 in a state in which battery assembly 10 is housed, outer case 4 illustrated in the drawings is provided with fixing rib 44 that allows setscrew 49 to pass through on side surfaces of second case 42, and with coupling boss 45 for screwing setscrew 49 on side surfaces of first case 41. In a state in which opening edges of facing peripheral walls of first case 41 and second case 42 are approached, this outer case 4 couples second case 42 and first case 41 by screwing setscrews 49 that pass through fixing ribs 44 into coupling bosses 45.

Furthermore, in outer case 4 illustrated in FIGS. 2 to 4, support ribs 46 to support battery assembly 10 housed in housing part 43 are provided on inner surfaces of outer peripheries of bottom surfaces 41A, 42A of box-shaped first case 41 and second case 42 and at boundary portions between the inner surfaces and the peripheral walls. Those support ribs 46 abut on end surfaces of battery assembly 10 housed in outer case 4 and separate surfaces of cover 7 from bottom surfaces 41A, 42A, respectively. With this configuration, cover areas 32 formed on the surface of battery holder 2 are respectively separated from bottom surfaces 41A, 42A at a predetermined distance, thereby providing gaps 47 between cover areas 32 and bottom surfaces 41A, 42A. As a result, even when cover area 32 of cover 7 is melted by a high-temperature jetting body jetted from battery cell 1, spreading fire to outer case 4 can be suppressed.

Furthermore, in the battery pack, as illustrated in chain lines in FIG. 4, flameproof member 15 can be disposed on a surface of battery assembly 10 housed in outer case 4 and on the surface of cover 7 of battery holder 2. Entire flameproof member 15 is formed in a sheet shape or a plate shape and can be fixed by being stacked on the surface of cover 7. It is preferable that this flameproof member 15 be disposed in an area that covers cover area 32. This flameproof member 15 prevents flame etc. passed through after melting or destroying cover area 32 from spreading to outer case 4.

Flameproof member 15 is formed of a material having flame resistance or flame retardance. For example, flameproof member 15 is formed of a flame-retardant fiber or resin. Specifically, a carbon fiber, an aramid fiber, etc. molded into a sheet shape or a plate shape can be used for flameproof member 15. Furthermore, the flameproof member can be a sheet material made of metal or a metal mesh.

In this way, in the battery pack formed by further covering the surface of cover 7 with flameproof member 15, even if cover area 32 of cover 7 is melted by heat when battery cell 1 is abnormal and flame etc. passes through this cover area 32, spreading fire to outer case 4 is suppressed by flameproof member 15. Therefore, since cover area 32 of cover 7 is designed to be thin and melted systematically, this battery pack can effectively suppress spreading fire to outer case 4 and catching fire to other battery cell 1 while consuming more energy.

The present invention is a battery pack formed by holding a plurality of battery cells in a battery holder and housing the battery holder in an outer case. The battery pack enhances safety by suppressing spreading fire or catching fire caused by a jetting body jetted from an end surface of the battery cell, when the battery cell is abnormal. The battery pack can be suitably used as a power supply for an electric tool, an electric assist bicycle, an electric motorcycle, an electric tricycle, an electric cart, a cleaner, or the like, and further, as a power storage use at home, store, or the like.

The invention claimed is:

1. A battery pack comprising:
   a plurality of battery cells each formed by closing an opening of a bottomed cylindrical outer can with a sealing plate having a protrusion electrode, each of the plurality of battery cells is provided with an exhaust port on the sealing plate;
   a battery holder configured to hold the plurality of battery cells in a parallel attitude, and to hold electrode terminals provided at both ends of each of the battery cells in an attitude disposing on respective same planes; and
   an outer case configured to house a battery assembly formed by holding the plurality of battery cells in the battery holder,
   wherein
   each of the plurality of battery cells has the protrusion electrode provided at one end, and a bottom surface of the outer can at another end opposite the protrusion electrode, and in the battery assembly, the protrusion electrode of one of the plurality of battery cells is connected to the bottom surface of another adjacent battery cell of the plurality of battery cells so as to connect each of the plurality of battery cells in series,
   the battery holder includes:
   a holding part configured to hold the ends of the plurality of battery cells along outer peripheral surfaces of the bottomed cylindrical outer cans; and
   a first cover and a second cover, the first cover configured to cover a first end surface side or a second end surface side of the plurality of battery cells held by the holding part, the second cover configured to configure another of the first end surface or the second end surface side of the plurality of battery cells held by the holding part opposite the first cover,
   wherein the first cover and the second cover each comprise a ring-shaped ridge at a position facing the first end surface side and the second end surface side, respectively, of the plurality of battery cells, and
   when one of the battery cells is abnormal, one of the first cover or the second cover is deteriorated by energy of a jetting body jetted from an end surface of the one of the battery cells.

2. The battery pack according to claim 1, wherein at least one of the first cover and the second cover includes a cover area that faces the first end surface or the second end surface of each of the battery cells, and when the one of the battery cells is abnormal, the cover area is chemically or physically changed by the energy of the jetting body jetted from the first end surface or the second end surface of the one of the battery cells.

3. The battery pack according to claim 1, wherein a lead plate is connected to the electrode terminals at both the ends of the plurality of battery cells, and the lead plate is sealed in the battery holder.

4. The battery pack according to claim 1, wherein the battery holder includes a pair of holder units configured to hold both the ends of the plurality of battery cells, and the battery holder holds the plurality of battery cells at fixed positions by coupling the pair of holder units.

5. The battery pack according to claim 4, wherein each of the holder units forms the holding part and one of the first cover or the second cover separately,
   the holding part includes an end surface plate provided with a plurality of insertion parts held by inserting the ends of the plurality of battery cells,
   the one of the first cover or the second cover includes a closing plate fixed by being stacked on the end surface plate, and
   the insertion parts are insertion holes opened on the end surface plate, and the end surface side of the battery cells inserted into the insertion holes is covered with the closing plate.

6. The battery pack according to claim 4, wherein
   each of the holder units forms the holding part and one of the first cover or the second cover separately,
   the holding part includes an end surface plate provided with a plurality of insertion parts held by inserting the ends of the plurality of battery cells,
   the one of the first cover or the second cover includes a closing plate fixed by being laminated on the end surface plate, and
   the insertion parts are holding barrels coupled to the end surface plate, the holding barrels are respectively coupled to insertion holes opened on the end surface plate, and the end surface side of the battery cells inserted into the holding barrels is covered with the closing plate.

7. The battery pack according to claim 4, wherein each of the holder units is formed by integrally molding the holding part and the first cover and the second cover.

8. The battery pack according to claim 1, wherein
   the holding part includes a battery housing part provided with a plurality of insertion parts housing the plurality of battery cells, each of the first cover and the second cover includes a closing plate fixed by being stacked on both end surfaces of the battery housing part, and the insertion parts are insertion holes opened on the battery housing part or barrels forming the battery housing part, and the end surface side of the battery cells inserted into the insertion parts is covered with the closing plate.

9. The battery pack according to claim 5, wherein the holding part is formed with, on an outer surface in which the end surfaces of the plurality of battery cells are disposed, a recess disposed with a lead plate connected to the electrode terminals exposed from the insertion holes.

10. The battery pack according to claim 9, wherein the closing plate is formed with a fitting protrusion fitted into the recess on a surface facing the holding part.

11. The battery pack according to claim 9, wherein the lead plate connects the plurality of adjacent battery cells in the recess, and the holding part includes a partition wall located between the battery cells connected to the lead plate and protruding from a bottom surface of the recess.

12. The battery pack according to claim 11, wherein the lead plate includes a plurality of connecting parts connected to the electrode terminals of the battery cells and a coupling part formed by coupling the plurality of connecting parts, and a groove is formed by bending the coupling part in a groove shape to guide the partition wall.

13. The battery pack according to claim 12, wherein the holding part arranges the plurality of battery cells longitudinally and transversely, and the partition wall formed in the recess includes a crossing part formed by crossing in a cross shape, and the lead plate forms a through-hole opened at a position facing the crossing part.

14. The battery pack according to claim 1, wherein each of the first cover and the second cover includes a forming recess on a surface side of an area facing the end surface of each of the battery cells, a bottom surface of the forming recess is a cover area facing the end surface of each of the battery cells, and a thickness of the cover area is adjusted by adjusting a depth of the forming recess.

15. The battery pack according to claim 1, wherein a flameproof member formed in a sheet shape or a plate shape is disposed on a surface of the battery assembly and on a surface side of each of the first cover and the second cover.

16. The battery pack according to claim 1, wherein the outer case includes a support rib protruding on an inner surface of a bottom surface, and a surface of each of the first cover and the second cover is separated from the bottom surface by abutting the support rib on an end surface of the battery assembly.

17. The battery pack according to claim 6, wherein the holding part is formed with, on an outer surface in which the end surfaces of the plurality of battery cells are disposed, a recess disposed with a lead plate connected to the electrode terminals exposed from the insertion holes.

18. The battery pack according to claim 8, wherein the holding part is formed with, on an outer surface in which the end surfaces of the plurality of battery cells are disposed, a recess disposed with a lead plate connected to the electrode terminals exposed from the insertion holes.

19. The battery pack according to claim 1, wherein each of the first cover and the second cover includes a cover area that faces the end surface of each of the battery cells, and when the one of the battery cells is abnormal, the cover area is melted by the energy of the jetting body jetted from the end surface of the one of the battery cells.

20. The battery pack according to claim 1, wherein an inner diameter of the ring-shaped ridge is larger than an outer diameter of the protrusion electrode provided at one end of the battery cell.

* * * * *